US012398849B2

(12) United States Patent
Van Bommel et al.

(10) Patent No.: US 12,398,849 B2
(45) Date of Patent: Aug. 26, 2025

(54) LED FILAMENT FOR ILLUMINATION AND DISINFECTION

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/727,722

(22) PCT Filed: Dec. 23, 2022

(86) PCT No.: PCT/EP2022/087679
§ 371 (c)(1),
(2) Date: Jul. 10, 2024

(87) PCT Pub. No.: WO2023/131551
PCT Pub. Date: Jul. 13, 2023

(65) Prior Publication Data

US 2025/0146628 A1 May 8, 2025

(30) Foreign Application Priority Data

Jan. 10, 2022 (EP) .................................... 22150644

(51) Int. Cl.
*F21K 9/238* (2016.01)
*F21Y 103/10* (2016.01)
(Continued)

(52) U.S. Cl.
CPC ........... *F21K 9/238* (2016.08); *F21Y 2103/10* (2016.08); *F21Y 2113/17* (2016.08); *F21Y 2115/10* (2016.08)

(58) Field of Classification Search
CPC ....................................................... F21K 9/238
(Continued)

(56) References Cited

U.S. PATENT DOCUMENTS 5,712,468 A * 1/1998 Ace ...................... H05B 6/6444 219/758
11,460,171 B1 * 10/2022 Wilkerson .............. F21V 14/06
(Continued)

FOREIGN PATENT DOCUMENTS

| | | | |
|---|---|---|---|
| CN | 201028461 | Y | 2/2008 |
| WO | 2020239655 | A1 | 12/2020 |
| WO | 2021018606 | A1 | 2/2021 |

*Primary Examiner* — Bryon T Gyllstrom

(57) ABSTRACT

A light emitting diode, LED, filament (100) comprising an array of a plurality of light emitting diodes (110), LEDs, circuitry (120) coupled to the plurality of LEDs, a carrier (130) arranged to support the plurality of LEDs, an encapsulant (140) comprising a translucent material and a luminescent material configured to at least partially convert the LED light into converted light, wherein the plurality of LEDs comprises a first set (150) of LEDs arranged to emit first LED light in a first wavelength range of 430-490 nm, and a second set (160) of LEDs arranged to emit second LED light in a second wavelength range of 315-420 nm, wherein the circuitry is configured to provide the first set of LEDs with a first current, $I_{c1}$, and to provide the second set of LEDs with a second current, $I_{c2}$, during operation of the LED filament, wherein $I_{c2}>I_{c1}$.

14 Claims, 5 Drawing Sheets

(51) Int. Cl.
*F21Y 113/17* (2016.01)
*F21Y 115/10* (2016.01)

(58) Field of Classification Search
USPC .......................................................... 362/362
See application file for complete search history.

(56) References Cited

U.S. PATENT DOCUMENTS

| | | | | |
|---|---|---|---|---|
| 2005/0253533 | A1* | 11/2005 | Lys | F21V 23/003 315/291 |
| 2008/0008620 | A1* | 1/2008 | Alexiadis | F21S 4/26 422/186.3 |
| 2016/0131313 | A1 | 5/2016 | Miwa et al. | |
| 2019/0088833 | A1 | 3/2019 | Itoga et al. | |
| 2020/0314976 | A1 | 10/2020 | Soer et al. | |
| 2024/0216568 | A1* | 7/2024 | Lan | A61L 9/20 |

* cited by examiner

LED FILAMENT FOR ILLUMINATION AND DISINFECTION

CROSS-REFERENCE TO PRIOR APPLICATIONS

This application is the U.S. National Phase application under 35 U.S.C. § 371 of International Application No. PCT/EP2022/087679, filed on Dec. 23, 2022, which claims the benefit of European Patent Application No. 22150644.7, filed on Jan. 10, 2022. These applications are hereby incorporated by reference herein.

FIELD OF THE INVENTION

The present invention generally relates to lighting arrangements comprising one or more light emitting diodes, LEDs. More specifically, the present invention is related to provide a combination of a disinfection (bactericidal and/or viricidal) lighting effect and an aesthetically desirable (general) illumination.

BACKGROUND OF THE INVENTION

The use of light emitting diodes (LED) for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy. In particular, LED filament lamps are highly appreciated as they are very decorative.

Due to the advantageous aspects of the use of LEDs, the interest has rapidly increased to replace conventional light sources with LEDs in many lighting arrangements. It will be appreciated that this replacement, also called retrofitting, is appreciated and desired by users who wish to have the look of an incandescent bulb. The light source replacement (retrofitting) is often performed by removing the conventional light source(s) from the luminaire (e.g. a lamp holder) of the lighting arrangement and attaching the LEDs, LED arrangement(s) or LED device(s) into the luminaire. One of these concepts is based on LED filaments which are placed in a bulb, as the appearance of lamps of this kind are appreciated as they are highly decorative.

Furthermore, it is of interest to combine the advantageous properties of LED filaments with respect to aesthetics and light distribution purposes according to the above with the advantageous properties of disinfection (bactericidal) lighting. It will be appreciated that disinfection lighting has become a topic of renewed interest as the demand for sterilization increases. For example, UVA (315-400 nm) and/or violet light (400-420 nm) can be used for disinfection purposes, e.g. inactivating/killing bacteria.

Hence, it is an object of the present invention to combine the advantageous properties of LED filaments with respect to aesthetics and light distribution purposes with the advantageous properties of disinfection (bactericidal and/or viricidal) lighting.

WO 2021/018060 discloses a light emitting diode, LED, filament arrangement is provided. The LED filament arrangement comprises a LED filament comprising an array of a plurality of light emitting diodes. The LED filament comprises a first subset of at least two LEDs, and a second subset of at least two LEDs, wherein the first subset of LEDs is different from the second subset of LEDs. The LEDs of the first subset are coupled in series and the LEDs of the second subset differs from the luminous flux of the individual LEDs of the second subset during operation of the LED filament arrangement.

SUMMARY OF THE INVENTION

It is of interest to combine the advantageous properties of LED filaments with respect to aesthetics and light distribution purposes with the advantageous properties of providing disinfection (bactericidal and/or viricidal) lighting.

This and other objects are achieved by providing a LED filament having the features in the independent claim. Preferred embodiments are defined in the dependent claims.

Hence, according to the present invention, there is provided a light emitting diode, LED, filament, configured to emit LED filament light. The LED filament comprises an array of a plurality of light emitting diodes, LEDs, configured to emit first LED light. The LED filament further comprises circuitry coupled to the plurality of LEDs. The LED filament further comprises a carrier arranged to support the plurality of LEDs. The LED filament further comprises an encapsulant comprising a translucent material. The encapsulant further comprises a luminescent material configured to at least partially convert the LED light into converted light. The encapsulant at least partially encloses the plurality of LEDs and (at least partially encloses) the carrier. The plurality of LEDs comprises a first set of LEDs arranged to emit first LED light in a first wavelength range of 430-490 nm, and a second set of LEDs arranged to emit second LED light in a second wavelength range of 315-420 nm. The circuitry is configured to provide the first set of LEDs with a first current, $I_{c1}$, and to provide the second set of LEDs with a second current, $I_{c2}$, during operation of the LED filament, wherein $I_{c2}>I_{c1}$.

Thus, the present invention is based on the idea of providing a LED filament wherein a first set of LEDs are arranged to emit predominantly blue light and a second set of LEDs are arranged to emit predominantly UV and/or violet light. By the encapsulant, the blue light is (at least partially) converted into typically yellow and/or red light to obtain (extremely) warm white light, such as 1800-2500 K, whereas the UV and/or violet light provides a disinfection effect, i.e. an inactivation of bacteria. As the conversion ratio for UV and/or violet light is much lower than for blue light and that UV and/or violet light, which may be perceived as blue (or bluish) light is less visible than blue light, it is proposed to provide a higher current to the violet LEDs than the blue LEDs. Hence, by the combination of blue and violet LEDs in the LED filament, and by the provision of a different current to the blue and violet LEDs, there is provided a LED filament which is able to efficiently provide a disinfection lighting as well as a desired lighting for illumination purposes, whilst being decorative and aesthetically pleasing (preferably a substantial continuous color point/correlated color temperature along a length of the LED filament, i.e. across a plurality of violet and blue LEDs).

The present invention is further advantageous in that the encapsulant of the LED filament is able to provide a desired light output, comprising a desired (omnidirectional) distribution of the light as well as being able to provide an aesthetically decorative or appealing lighting effect.

It will be appreciated that the LED filament of the present invention furthermore comprises relatively few components. The relatively low number of components is advantageous in that the LED filament is relatively inexpensive to fabricate. Moreover, the relatively low number of components of the LED filament implies an easier recycling, especially compared to devices or arrangements comprising a relatively high number of components which impede an easy disassembling and/or recycling operation.

The LED filament, which is configured or arranged to emit LED filament light, comprises an array of a plurality of LEDs which are configured or arranged to emit LED light. It will be appreciated that the LED filament light may comprise the LED light and/or the LED light as affected (e.g. scattered and/or converted) by the encapsulant of the LED filament. By the term "array", it is here meant a linear arrangement or chain of LEDs, or the like, arranged on the LED filament. The LED filament further comprises circuitry coupled to the plurality of LEDs. By the term "circuitry", it is here meant one or more electrical circuits which is (are) configured for a supply of electrical power to the plurality of LEDs.

The LED filament further comprises a carrier arranged to support the plurality of LEDs. Hence, the plurality of LEDs may be arranged, mounted and/or mechanically coupled on/to a carrier (e.g. a substrate), wherein the carrier is configured to mechanically and/or electrically support the LEDs. Furthermore, the carrier may be light transmissive and/or reflective. The carrier may furthermore be elongated in order to support the array of LEDs of the (elongated) LED filament.

The LED filament further comprises an encapsulant. By the term "encapsulant", it is here meant a material, element, arrangement, or the like, which is configured or arranged to at least partially surround, encapsulate and/or enclose the plurality of LEDs, the carrier and the at least one heat sink of the LED filament. The encapsulant comprises a translucent material. By the term "translucent material", it is here meant a material, composition and/or substance which is translucent and/or transparent for visible light. The encapsulant further comprises a luminescent material configured to at least partly convert the LED light emitted from the plurality of LEDs into converted light. The encapsulant at least partially encloses the plurality of LEDs and the carrier.

The plurality of LEDs comprises a first set of LEDs arranged to emit first LED light in a first wavelength range of 430-490 nm. Hence, the first set of LEDs is arranged or configured to emit first LED light which is predominantly blue. The plurality of LEDs further comprises a second set of LEDs arranged to emit second LED light in a second wavelength range of 315-420 nm (especially for second LED light in a second wavelength range of 315-360 and/or 400-420 nm). Hence, the second set of LEDs is arranged or configured to emit second LED light which is predominantly violet and/or ultraviolet (UV).

The circuitry is configured to provide the first set of LEDs with a first current, $I_{c1}$, and to provide the second set of LEDs with a second current, $I_{c2}$, during operation of the LED filament, wherein $I_{c2}>I_{c1}$. Hence, the circuitry of the LED filament is configured to provide a higher current to the violet LEDs compared to the blue LEDs during operation of the LED filament.

According to an embodiment of the present invention, the first current, $I_{c1}$, and the second current, $I_{c2}$, may fulfill $I_{c2}>3\cdot I_{c1}$. Hence, the circuitry of the LED filament is configured to provide the first set of (blue) LEDs with a first current, $I_{c1}$, and to provide the second set of (violet) LEDs with a second current, $I_{c2}$, during operation of the LED filament, wherein the second current, $I_{c2}$, is at least three times as high as the current, $I_{c1}$, i.e. $I_{c2}>3\cdot I_{c1}$. The present embodiment is advantageous in that the second set of (violet) LEDs hereby may be provided with a much higher current than the first set of (blue) LEDs, as the conversion ratio for UV and/or violet light is much lower than for blue light and that UV and/or violet light, which may be perceived as blue (or bluish) light is less visible than blue light. More preferably $I_{c2}>4\cdot I_{c1}$, and most preferably $I_{c2}>5\cdot I_{c1}$, especially for second LED light in a second wavelength range of 315-360 and/or 400-420 nm.

According to an embodiment of the present invention, at least two LEDs of the first set of LEDs may be coupled in parallel, and wherein at least two LEDs of the second set of LEDs may be coupled in series. Hence, the circuitry of the LED filament may be arranged or configured such that two or more (blue) LEDs may be coupled in parallel and such that two or more (violet) LEDs may be coupled in series. The present embodiment is advantageous in that the LED filament hereby achieves a convenient circuitry for providing the first set of LEDs with a first current, $I_{c1}$, and to provide the second set of LEDs with a second current, $I_{c2}$, during operation of the LED filament, wherein $I_{c2}>I_{c1}$.

According to an embodiment of the present invention, the circuitry may comprise a first circuit coupled to the first set of LEDs and a second circuit coupled to the second set of LEDs, wherein the first and second circuit are electrically isolated from each other. The first and second circuit of the circuitry of the LED filament may hereby be electrically separated. The present embodiment is advantageous in that the provision of electrically isolated circuits with respect to the first and second set of LEDs even further facilitates the operation of providing the first set of LEDs with a first current, $I_{c1}$, and providing the second set of LEDs with a second current, $I_{c2}$. The present embodiment further facilitates a control of the operation of the first and second set of LEDs.

According to an embodiment of the present invention, the encapsulant, via the luminescent material thereof, may be configured to, during operation of the LED filament, convert a portion of the first LED light into first converted light at a first conversion ratio, $R_1$, wherein the first converted light has a first converted light intensity, $Iconv_1$, and convert a portion of the second LED light into second converted light at a second conversion ratio, $R_1$, wherein the second converted light has a second converted light intensity, $Iconv_2$, wherein $R_1/R_2>3$ preferably $R_1/R_2>5$, and $0.8<(Iconv_1/Iconv_2)<1.2$. In other words, the encapsulant comprising the luminescent material may be arranged or configured to convert portions of the first and second LED lights, respectively, into first and second converted lights, respectively, at first and second ratios, $R_1$ and $R_2$, respectively, wherein the first and second converted lights have first and second converted light intensities, $Iconv_1$ and $Iconv_2$, respectively, wherein $R_1/R_2>3$ and $0.8<(Iconv_1/Iconv_2)<1.2$ are fulfilled. Hence, the first converted light intensity outside the encapsulant and in a vicinity of the first set of LEDs is similar, or almost similar, to the second converted light intensity outside the encapsulant and in a vicinity of the second set of LEDs. The present embodiment is advantageous in that occurrences of dark areas of the LED filament may be avoided, or at least mitigated. Consequently, this leads to improved aesthetics and/or light distribution purposes of the LED filament. Furthermore, the effect of the disinfection (bactericidal) lighting of the LED filament may also be improved.

According to an embodiment of the present invention, the first set of LEDs may be arranged to emit the first LED light with a first LED intensity, $ILED_1$, and wherein the second set of LEDs may be arranged to emit the second LED light with a second LED intensity, $ILED_2$, wherein $ILED_2>2\cdot ILED_1$. Hence, the second (violet) LED intensity, $ILED_2$, is at least twice as high as the first (blue) LED intensity, $ILED_1$. It should be noted that, especially at relatively low intensities, deviations in intensities may be much more easily visible (e.g. LED spottiness) than at relatively high intensities (due to glare). The present embodiment is therefore advantageous in that disadvantageous effects, in particular with respect to aesthetic purposes, may be avoided or at least mitigated by the relatively high intensity of the violet LED light compared to the relatively low intensity of the blue LED light.

According to an embodiment of the present invention, the LED filament may be arranged to emit LED filament light having a luminous flux, LF, wherein in case the luminous flux, LF, is above a first luminous flux threshold, $LF_{t1}$, the first set of LEDs is arranged to emit first LED light with a first LED intensity, $ILED_1$, and the second set of LEDs is arranged to emit second LED light with a second LED intensity, $ILED_2$, wherein $ILED_1 \leq ILED_2 \leq 2 \cdot ILED_1$, and in case the luminous flux, LF, is below a second luminous flux threshold, $LF_{t2}$, the first set of LEDs is arranged to emit first LED light with a first LED intensity, $ILED_1$, and the second set of LEDs is arranged to emit second LED light with a second LED intensity, $ILED_2$, wherein $ILED_2 > 8 \cdot ILED_1$. Hence, the in case of a relatively high luminous flux, FL, the second (violet) LED intensity, $ILED_2$, is higher than the first (blue) LED intensity, $ILED_1$, and may almost be as high as two times the first (blue) LED intensity, $ILED_1$. Alternatively, in case of a relatively low luminous flux, FL, the second (violet) LED intensity, $ILED_2$, may be significantly higher than the first (blue) LED intensity, $ILED_1$, as it may be more than three times as high as the first (blue) LED intensity, $ILED_1$.

According to an embodiment of the present invention, the second set of LEDs may be arranged to emit second LED light in a second wavelength subrange of 400-420 nm, wherein a first luminous intensity of the first LED light, Llb, and a second luminous intensity of the second LED light, LIv, may fulfill $1.2 \cdot Llb > LIv > 0.8 \cdot Llb$. Hence, during operation of the LED filament, much more UV and/or violet light than blue light is created, such that the first luminous intensity of the first (blue) LED light, Llb, may be similar, or almost similar, to the second luminous intensity of the second (violet) LED light, LIv. The present embodiment is advantageous in that it even further counteracts, or even annihilates, occurrences of dark areas of the LED filament during operation.

According to an embodiment of the present invention, a number, $N_1$, of the LEDs of the first set of LEDs and a number, $N_2$, of the LEDs of the second set of LEDs may fulfill $N_1 > 2 \cdot N_2$. Hence, the number, $N_1$, of the LEDs of the first set of (blue) LEDs may be more than twice as high as the number, $N_2$, of the LEDs of the second set of (violet) LEDs. It should be noted that the second set of (violet) LEDs provide a relatively high light output compared to the relatively low light output of the first set of (blue) LEDs. Hence, the present embodiment is advantageous in that the higher number, $N_1$, of the LEDs of the first set of (blue) LEDs than the number, $N_2$, of the LEDs of the second set of (violet) LEDs compensates the higher light output of the second set of (violet) LEDs compared to the lower light output of the first set of (blue) LEDs.

According to an embodiment of the present invention, the luminescent material of the encapsulant may comprise at least one of a YAG, LuAg and LuYAG phosphor. Hence, the luminescent material of the encapsulant may comprise yttrium aluminium garnet, YAG, lutetium aluminium garnet, LuAg, and/or lutetium-yttrium aluminium garnet, LuYAG, phosphor.

According to an embodiment of the present invention, there is provided a LED filament arrangement. The LED filament arrangement may comprise one or more LED filaments according to any one of the preceding embodiments. The LED filament arrangement may further comprise a controller coupled to the circuitry, wherein the controller is configured to individually control the operation of the first set of LEDs and the second set of LEDs. Hence, via the controller, the circuitry is configured to provide the first set of LEDs with a first current, $I_{c1}$, and to provide the second set of LEDs with a second current, $I_{c2}$, during operation of the LED filament, wherein $I_{c2} > I_{c1}$. The present embodiment is advantageous in that the controller may conveniently and efficiently control the circuitry current by providing different current to the blue and violet LEDs, which consequently leads to an efficient provision of a disinfection lighting as well as a desired lighting for illumination purposes, whilst being decorative and aesthetically pleasing.

According to an embodiment of the present invention, the LED filament may have at least one of a spiral, meander, coil and helix shape. Hence, LED filament may elongate in a spiral shape, meandering shape, coil shape and/or the helix shape. By "spiral shape", it is here meant that the LED filament elongates in a coil or corkscrew shape. By "meandering shape", it is here meant an "S" shape, "snake" shape, or the like, wherein the LED filament elongates by this shape in a plane. By "helix shape", it is here meant that the LED filament may be twisted around its own axis. It should be noted that any combination of the above-mentioned examples may be feasible, such as a combination of the spiral shape and the helix shape. The present embodiment is advantageous in that the configuration(s) of the LED filament may achieve an effectful emission of the LED filament light and achieve a decorative LED filament during operation thereof.

According to an embodiment of the present invention, the LED filament light may be white light having a correlated color temperature, CCT, below 2500 K. The present embodiment is advantageous in that the white light of the LED filament during operation is a light that appears "warm", and may further contribute to the aesthetics of the LED filament light.

According to an embodiment of the present invention, there is provided a LED filament arrangement. The LED filament arrangement comprises at least one LED filament according to any one of the preceding embodiments, and a controller coupled to the circuitry, wherein the controller is configured to individually control the operation of the first set of LEDs and the second set of LEDs. By the present embodiment, the controller of the LED filament arrangement, via the circuitry of the LED filament, is configured to provide the first set of LEDs with the first current, $I_{c1}$, and to provide the second set of LEDs with the second current, $I_{c2}$, during operation of the LED filament, wherein $I_{c2} > I_{c1}$. The present embodiment is advantageous in that the controller may conveniently and efficiently control the distribution of current in the circuitry, which consequently leads to an efficient disinfection lighting as well as a desired lighting for illumination purposes, whilst being decorative and aesthetically pleasing.

According to an embodiment of the present invention, the controller may be configured to individually control the operation of the first set of LEDs and the second set of LEDs by at least one of increasing a first intensity, $ILED_1$, of the first set of LEDs, and increasing a second intensity, $ILED_2$, of the second set of LEDs such that $0 \leq ILED_1 \leq 0.5 \cdot ILED_2$, and decreasing a first intensity, $ILED_1$, of the first set of LEDs, and decreasing a second intensity, $ILED_2$, of the second set of LEDs such that $0 \leq ILED_1 \leq 0.5 \cdot ILED_2$. Hence, the controller may be configured to increase and/or decrease the first and second intensities, $ILED_1$, $ILED_2$, wherein during the increase as well as during the decrease in the first intensity, $ILED_1$, of the first set of (blue) LEDs, the controller is configured to keep the second intensity, $ILED_2$, of the second set of (violet) LEDs higher than the first intensity, $ILED_1$, of the first set of (blue) LEDs.

According to an embodiment of the present invention, there is provided a LED lighting device. The LED lighting device may comprise one of a LED filament according to any of the preceding embodiments and a LED filament arrangement according to any one of the preceding embodiments. The LED lighting device further comprises a cover comprising an at least partially transparent material, wherein the cover at least partially encloses the LED filament. The LED lighting device further comprises an electrical connection connected to the LED filament for a supply of power to the plurality of LEDs of the LED filament. By the term "cover", it is here meant an enclosing element, such as a cap, cover, envelope, or the like, comprising an at least partial translucent and/or transparent material. The present embodiment is advantageous in that the LED filament according to the invention may be conveniently arranged in substantially any lighting LED lighting device, such as a LED filament lamp or a LED filament luminaire, luminaire, lighting system, or the like. The LED lighting device may further comprise a driver for supplying power the LEDs of the LED filament. Additionally, the lighting device may further comprise a controller for individual control of the first set of LEDs and the second set of LEDs.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
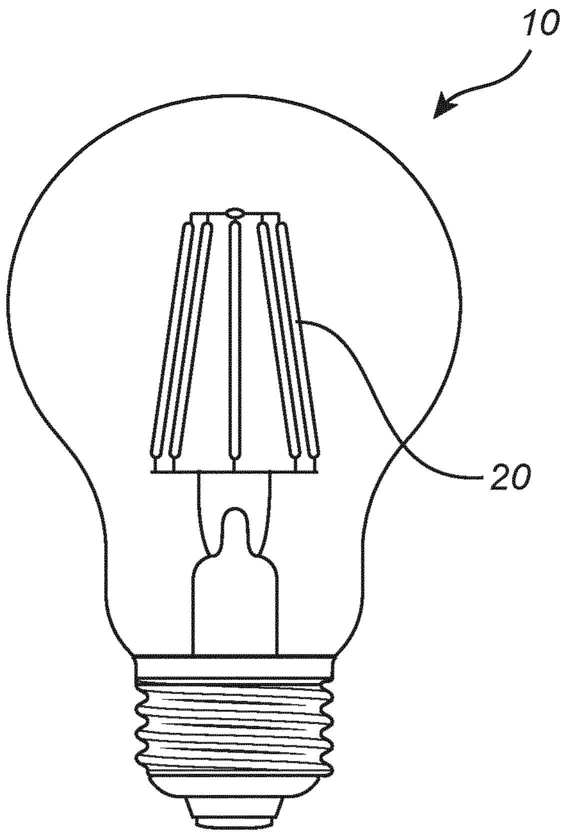
FIG. 1 schematically shows a LED filament lamp according to the prior art, comprising LED filaments, FIGS. 2*a*-2*c* schematically show a LED filament according to exemplifying embodiments of the present invention, FIG. 3*a* schematically discloses the relative intensity of the LED filament light during operation of a LED filament according to an exemplifying embodiment of the present invention, FIG. 3*b* schematically discloses the luminous flux, LF, of the LED filament light during operation of a LED filament according to an exemplifying embodiment of the present invention, FIG. 4 schematically shows a LED filament arrangement according to an embodiment of the present invention, FIG. 5 schematically shows a LED lighting device according to an exemplifying embodiment of the present invention, and FIG. 6 schematically shows radiometric power of UV/violet LEDs/Radiometric power of LEDs emitting at 450 nm according to an embodiment of the present invention.

FIG. 1 shows a LED filament lamp 10 according to the prior art, comprising a plurality of LED filaments 20. LED filament lamps 10 of this kind are highly appreciated as they are very decorative, as well as providing numerous advantages compared to incandescent lamps such as a longer operational life, a reduced power consumption, and an increased efficiency related to the ratio between light energy and heat energy.

Figure 2A:
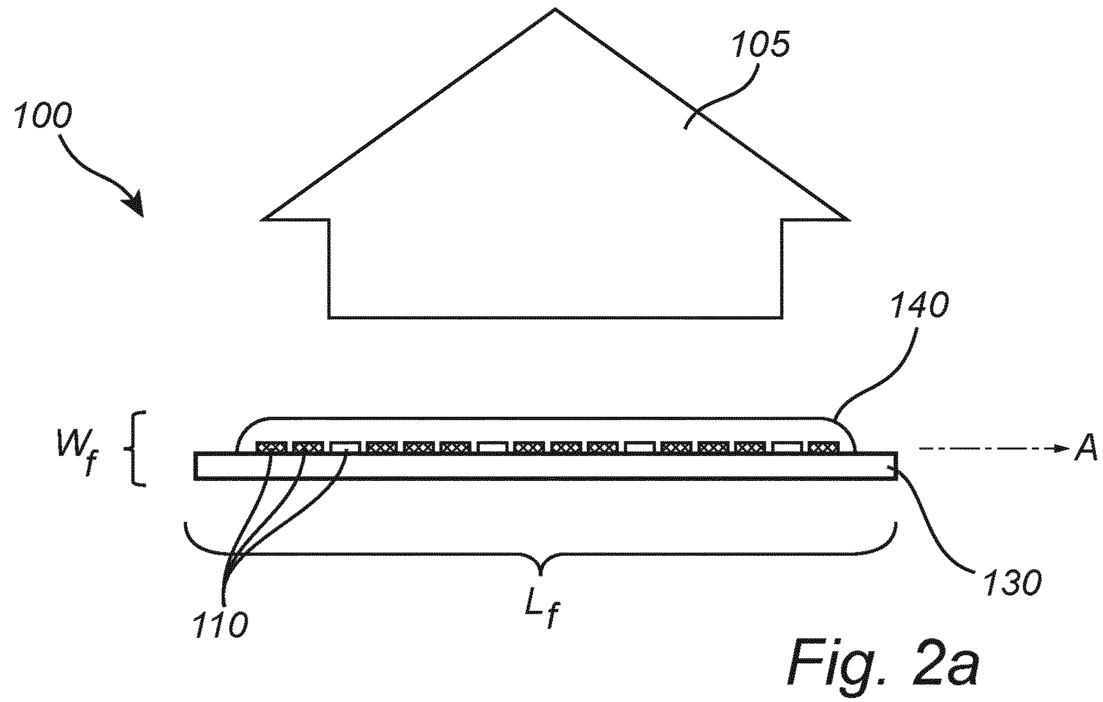

FIG. 2*a* schematically shows a LED filament 100 according to an exemplifying embodiment of the present invention. The LED filament 100, which elongates along the axis, A, is configured to emit LED filament light 105. The LED filament light 105 emitted from the LED filament 100 during operation is preferably white light having a correlated color temperature, CCT, below 2500 K. The white light has preferably a color rendering index, CRI, of at least 80. The LED filament 100 may preferably have a length, $L_f$, in the range from 1 cm to 20 cm, more preferably 2 cm to 12 cm, and most preferred 3 cm to 10 cm. The LED filament 100 may preferably have a width, $W_f$, in the range from 0.5 mm to 10 mm, more preferably 0.8 mm to 8 mm, and most preferred 1 to 5 mm. The aspect ratio $L_f/W_f$ is preferably at least 5, more preferably at least 8, and most preferred at least 10.

The LED filament 100 comprises an array or "chain" of a plurality of LEDs 110 configured to emit LED light. For example, the array or "chain" of the plurality of LEDs 110 may comprise a plurality of adjacently arranged LEDs 110. The plurality of LEDs 110 preferably comprises more than 5 LEDs, more preferably more than 8 LEDs, and even more preferred more than 10 LEDs.

The LED filament 100 further comprises a carrier 130 arranged to support the plurality of LEDs 110. The plurality of LEDs 110 may be arranged, mounted and/or mechanically coupled on/to the carrier 130. The carrier 130, e.g. a substrate, is configured to mechanically and/or electrically support the plurality of LEDs 110. The carrier 130 may be a printed circuit board (PCB). The carrier 130 may be light transmissive and/or reflective. Furthermore, the carrier 130 may be flexible, and may for example comprise a polymer foil (e.g. polyimide (PI), polyethylene terephthalate (PET), etc.). The carrier 130 may comprise one or more thermally conductive layers and one or more insulating layers.

In FIG. 2*a*, the LED filament 110 further comprises an encapsulant 140. The encapsulant 140 comprises a translucent material. Furthermore, the encapsulant 140 comprises a luminescent material configured to at least partly convert light emitted from the plurality of LEDs 120 into converted light. The encapsulant 140 may comprise a light-scattering material configured to scatter light emitted from the plurality of LEDs 120. The light-scattering material may preferably have a reflectivity of >70%, more preferably >80%, and most preferably >85%. The encapsulant 140 may be flexible. Furthermore, the encapsulant 140 may comprise silicone. The encapsulant 140, via its luminescent material, may be configured to, during operation of the LED filament 100, convert a portion of the first LED light into first converted light at a first conversion ratio, $R_1$, wherein the first converted light has a first converted light intensity, $Iconv_1$ (not shown) and convert a portion of the second LED light into second converted light at a second conversion ratio, $R_1$, wherein the second converted light has a second converted light intensity, $Iconv_2$ (not shown) wherein $R_1/R_2>3$ and $0.7 \leq (Iconv_1/Iconv_2)<1.3$, preferably $0.8 \leq (Iconv_1/Iconv_2)<1.2$.

In FIG. 2*a*, the encapsulant 140 at least partially encloses the plurality of LEDs 110 and the carrier 130. For example, and as indicated in FIG. 2*a*, the encapsulant 140 fully encloses the plurality of LEDs 110. The encapsulant 140 partially encloses the carrier 130, as the length and/or width of the carrier 130 may be longer and/or wider than the length and/or width of the LED filament 110. The LED filament light 105 may hereby comprise the LED light and/or the converted light. The luminescent material of the encapsulant 140 is configured to emit light under external energy excitation. For example, the luminescent material may comprise a fluorescent material. The luminescent material may comprise an inorganic phosphor, an organic phosphor and/or quantum dots/rods. More specifically, and according to an embodiment of the invention, the luminescent material of the encapsulant may comprises yttrium aluminium garnet (YAG), LuAg and/or LuYAG phosphor. The UV/blue LED light may be partially or fully absorbed by the luminescent material and converted to light of another color e.g. green, yellow, orange and/or red.

Figure 2B:
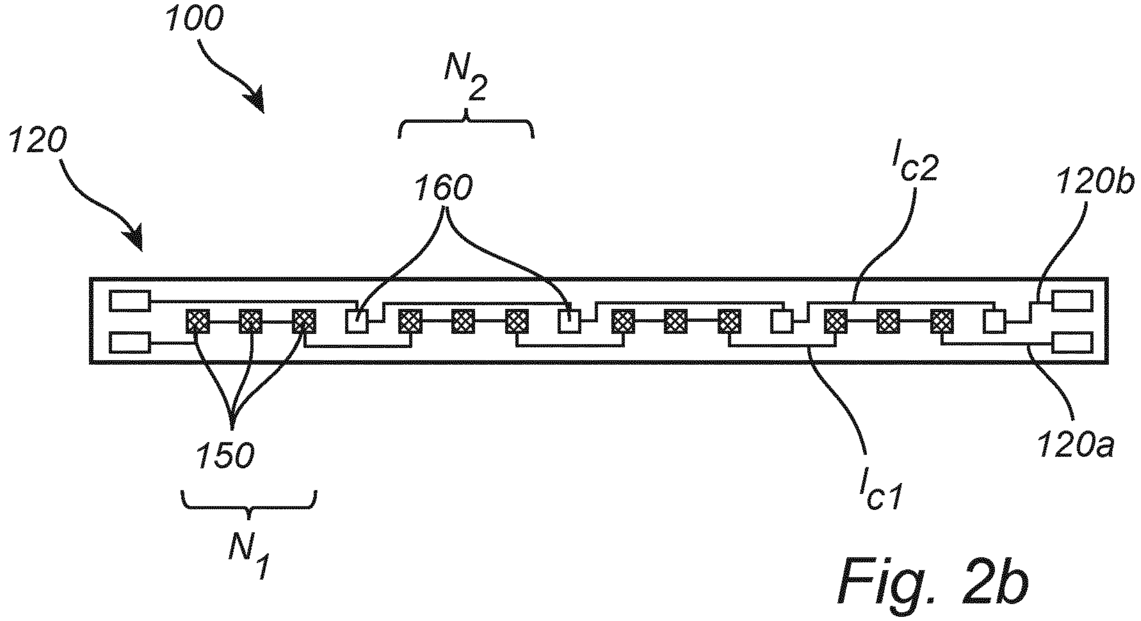

FIG. 2*b* schematically shows the LED filament 100 of FIG. 2*a* according to an exemplifying embodiment of the present invention, and it is referred to FIG. 2*a* for an increased understanding of the features and/or operation of the LED filament 100. The plurality of LEDs 110 comprises a first set 150 of LEDs arranged to emit light in a first wavelength range of 430-490 nm. Hence, the first set 150 of LEDs is arranged to emit light which is predominantly blue. The plurality of LEDs 110 further comprises a second set 160 of LEDs arranged to emit light in a second wavelength range of 315-420 nm. Hence, the second set 150 of LEDs is arranged to emit light which is violet or ultraviolet (UV). A number, $N_1$, of the LEDs of the first set 150 of LEDs and a number, $N_2$, of the LEDs of the second set 160 of LEDs, may, according to the example shown in FIG. 2*b* fulfill $N_1>2 \cdot N_2$, preferably $N_1>3 \cdot N_2$.

In FIG. 2*b*, the LED filament 100 further comprises circuitry 120 which is coupled to the plurality of LEDs 110. The circuitry 120 is configured to provide the first set of LEDs 150 with a first current, $I_{c1}$, during operation if the LED filament 100. The circuitry 120 is furthermore configured to provide the second set of LEDs 160 with a second current, $I_{c2}$, during operation of the LED filament 100. During operation, the LED filament 100 is configured to provide a larger current to the second set of LEDs 160, i.e. the violet LEDs, than to the first set of LEDs 150, i.e. the blue LEDs 150, such that $I_{c2}>I_{c1}$. For example, the first current, $I_{c1}$, and the second current, $I_{c2}$, may fulfill $I_{c2>}3 \cdot I_{c1}$. The circuitry 120 may comprise a first circuit 120*a* coupled to the first set of LEDs 150 and a second circuit 120*b* coupled to the second set of LEDs 160. The first and second circuits 120*a*, 120*b* may be electrically isolated from each other.

Figure 2C:
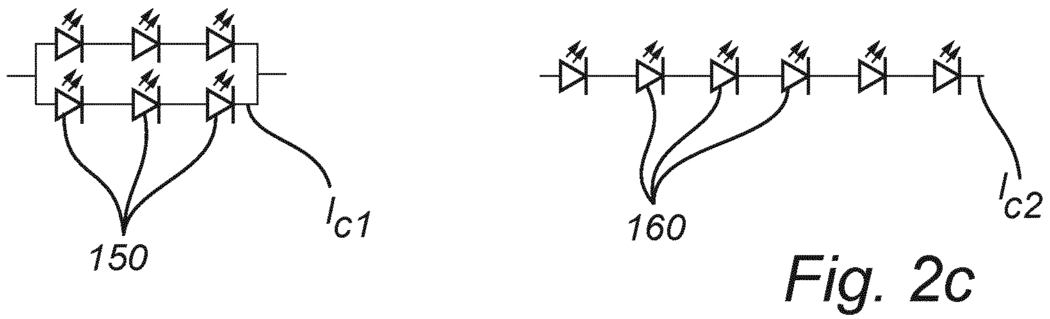

FIG. 2*c* schematically discloses portions of the circuitry 120 of the LED filament 100 of FIG. 2*b*, comprising the first set 150 of LEDs and the second set 160 of LEDs of the LED filament 100 of FIG. 2*a* and/or of FIG. 2*b*. Here, at least two LEDs of the first set 150 of LEDs are coupled in parallel, and at least two LEDs of the second set 160 of LEDs are coupled in series. Hence, the circuitry 120 of the LED filament 100 as exemplified in FIG. 2*b* is, via the example of FIG. 2*c*, arranged or configured such that two or more (blue) LEDs are coupled in parallel. It will be appreciated that FIG. 2*c* discloses two branches of the parallel coupling, but that substantially any number of branches may be provided for the parallel coupling. Furthermore, via the example of FIG. 2*c*, the circuitry 120 of the LED filament 100 is arranged or configured such that two or more (violet) LEDs are coupled in series. By the arrangement of the circuitry's 120 coupling of the first set 150 of LEDs in parallel and the second set 160 of LEDs in series, the LED filament 100 may provide the first set 150 of LEDs with a first current, $I_{c1}$, and the second set 160 of LEDs with a second current, $I_{c2}$, during operation of the LED filament 100, wherein $I_{c2}>I_{c1}$. According to an example, the circuitry 120 is configured to provide the first set 150 of LEDs with a first current per unit epitaxial area of p-n junction, $I_{c1}$, and to provide the second set 160 of LEDs with a second current, $I_{c2}$, per unit epitaxial of p-n junction, during operation of the LED filament, wherein $I_{c2}>I_{c1}$, so that the (second radiometric) power emitted per unit area by the second set 160 of LEDs is higher than the (first radiometric) power emitted per unit area for first set 150 of LEDs.

It should be noted that FIGS. 2*a-c* show exemplifying embodiments of LED filament(s) 110, and that the shape and/or number of LED filament(s) may differ from that/those shown. For example, the LED filament(s) 100 may have a spiral, meander, coil and/or helix shape.

Figure 3A:
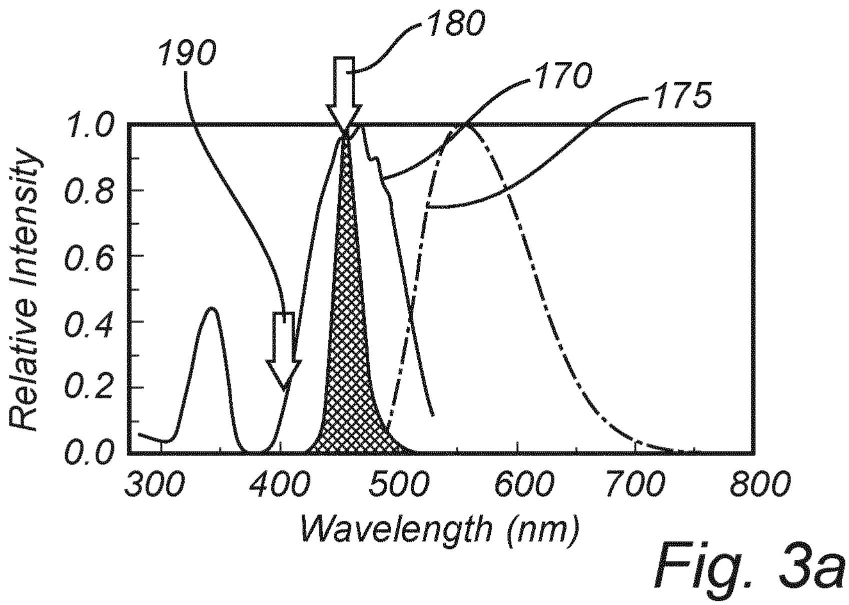

FIG. 3*a* schematically discloses the relative intensity of the LED filament light during operation of a LED filament according to an example of the present invention. In this specific example, the luminescent material of the encapsulant of LED filament comprises an YAG Ce phosphor as a function of wavelength. FIG. 3*a* shows the excitation spectra 170 and the emission spectra 175 of the LED filament light, wherein arrow 180 indicates the distribution of the first (blue) LED light and arrow 190 indicates the wavelength of the second (violet) LED light.

Figure 3B:
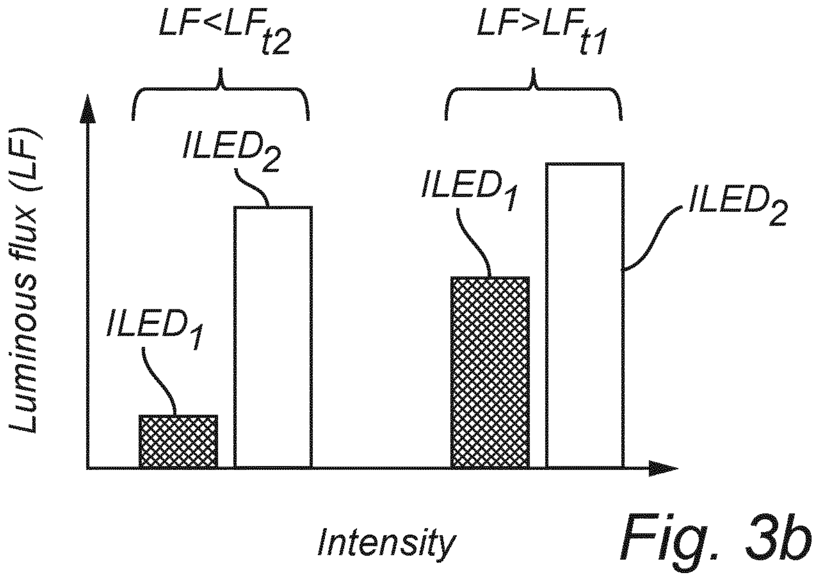

FIG. 3*b* schematically discloses the luminous flux, LF, as a function of intensity of the first and second LED light, respectively, in arbitrary units, of the LED filament light during operation of a LED filament according to an example of the present invention. The LED filament is arranged to emit LED filament light having a luminous flux, LF. In case the luminous flux, LF, is above a first luminous flux threshold, $LF_{t1}$, i.e. $LF>LF_{t1}$, the first set of LEDs is arranged to emit first (blue) LED light with a first LED intensity, $ILED_1$, and the second set of LEDs is arranged to emit second (violet) LED light with a second LED intensity, $ILED_2$, wherein $ILED_1 \leq ILED_2 \leq 2 \cdot ILED_1$, which is indicated in the right hand side of the diagram. In case the luminous flux, LF, is below a second luminous flux threshold, $LF_{t2}$, i.e. $LF<LF_{t2}$, the first set of LEDs is arranged to emit first (blue) LED light with a first LED intensity, $ILED_1$, and the second set of LEDs is arranged to emit second (violet) LED light with a second LED intensity, $ILED_2$, wherein $ILED_2>2 \cdot ILED_1$, preferably $ILED_2>3 \cdot ILED_1$. Hence, the in case of a relatively high luminous flux, FL, the second (violet) LED intensity (light power per unit emitting area), $ILED_2$, is higher than the first (blue) LED intensity (light power per unit emitting area), $ILED_1$, and may almost be as high as two times the first (blue) LED intensity, $ILED_1$. Alternatively, in case of a relatively low luminous flux, FL, the second (violet) LED intensity, $ILED_2$, may be significantly higher than the first (blue) LED intensity, $ILED_1$, as it may be more than three times as high as the first (blue) LED intensity, $ILED_1$. It will be appreciated that the first luminous flux threshold, $LF_{t1}$, and the second luminous flux threshold, $LF_{t2}$, may have the same value, or alternatively, have different values.

Figure 4:
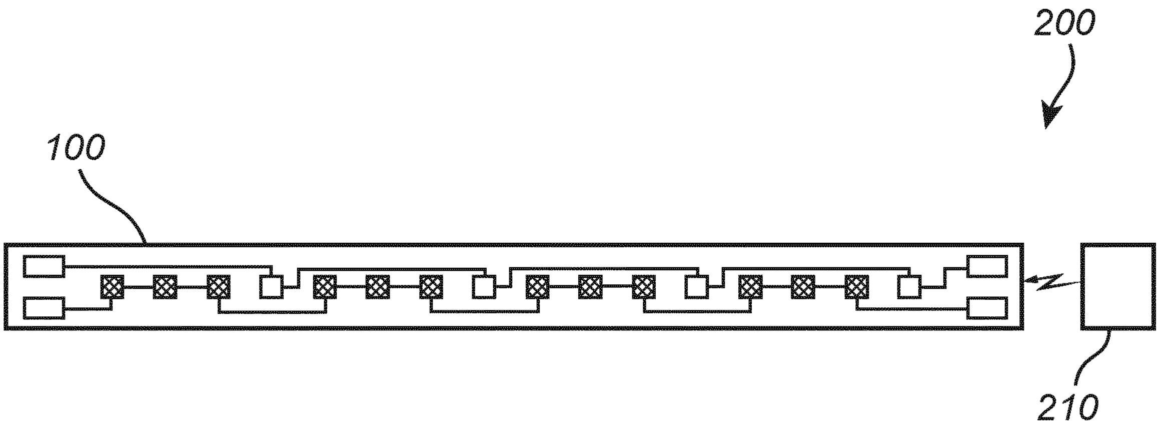

FIG. 4 schematically shows a LED filament arrangement 200 according to an embodiment of the present invention. The LED filament arrangement 200 comprises at least one LED filament 100 according to any one of the preceding embodiments. It should be noted that it is referred to FIGS. 2*a*-2*c* for an increased understanding of features and/or functions of the LED filament 100. The LED filament arrangement 200 further comprises a controller 210 coupled to the circuitry of the LED filament 100, wherein the controller 210 is configured to individually control the operation of the first set of LEDs and the second set of LEDs of the LED filament 100.

Figure 5:
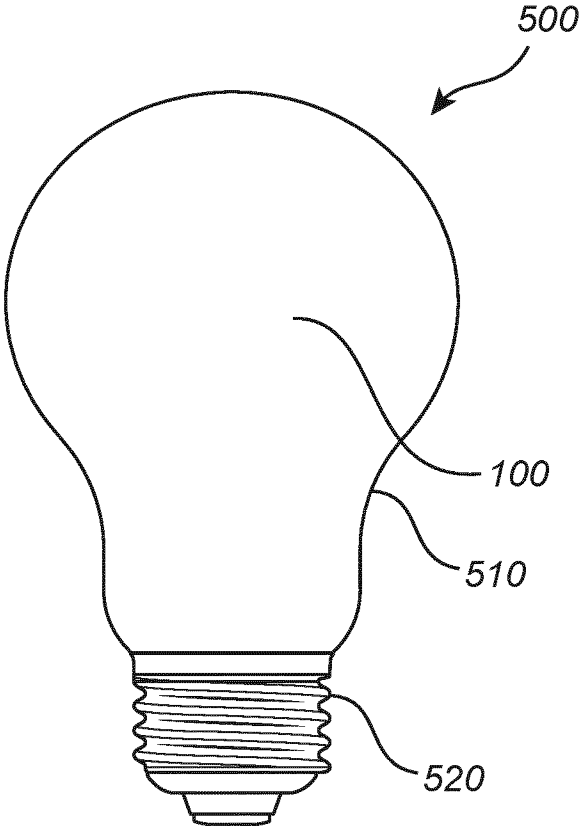

FIG. 5 schematically shows a LED lighting device 500 according to an embodiment of the present invention. The LED lighting device 500, which may constitute a lamp or a luminaire, comprises one or more LED filaments 110 according to any one of the previously described embodiments. The LED lighting device 500 further comprises a cover 510, which is exemplified as being bulb-shaped. The cover 510 may comprise an at least partially light transmissive (e.g. transparent) material, and the cover 510 at least partially encloses the LED filament 100. The LED lighting device 500 further comprises an electrical connection 520 connected to the LED filament 100 for a supply of power to the plurality of LEDs of the LED filament 100.

Figure 6:
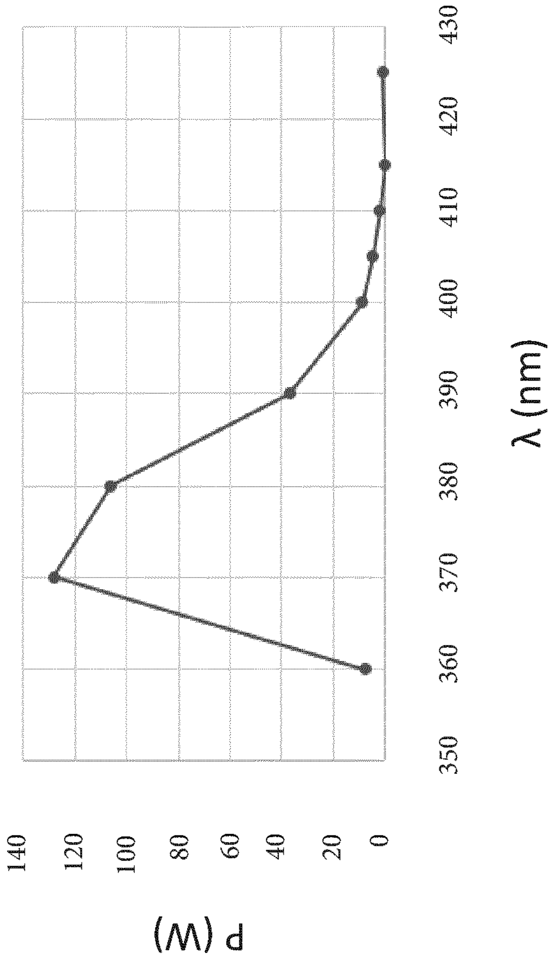

FIG. 6 schematically shows radiometric power of UV/violet LEDs/radiometric power of LEDs emitting at 450 nm for obtaining the same lumen output for the first and second set of LEDs through the phosphor of the encapsulant according to an embodiment of the present invention.

The person skilled in the art realizes that the present invention by no means is limited to the preferred embodiments described above. On the contrary, many modifications and variations are possible within the scope of the appended claims. For example, one or more of the LED filament 100, the carrier 130, the encapsulant 140, etc., may have different shapes, dimensions and/or sizes than those depicted/described.

The invention claimed is:

1. A light emitting diode, LED, filament, configured to emit LED filament light, comprising an array of a plurality of light emitting diodes, LEDs, configured to emit LED light, circuitry coupled to the plurality of LEDs, a carrier arranged to support the plurality of LEDs, an encapsulant comprising a translucent material and a luminescent material configured to at least partially convert the LED light into converted light, wherein the encapsulant at least partially encloses the plurality of LEDs and the carrier, wherein the plurality of LEDs comprises a first set of LEDs arranged to emit first LED light in a first wavelength range of 430-490 nm, and a second set of LEDs arranged to emit second LED light in a second wavelength range of 315-420 nm, wherein the circuitry is configured to provide the first set of LEDs with a first current, Ic1, and to provide the second set of LEDs with a second current, Ic2, during operation of the LED filament, wherein Ic2>Ic1 and wherein the encapsulant, via the luminescent material thereof, is configured to, during operation of the LED filament, convert a portion of the first LED light into first converted light at a first conversion ratio, R1, wherein the first converted light has a first converted light intensity, Iconv1, and convert a portion of the second LED light into second converted light at a second conversion ratio, R2, wherein the second converted light has a second converted light intensity, Iconv2, wherein R1/R2>3 and 0.7< (Iconv1/Iconvz2)<1.3.

2. The LED filament according to claim 1, wherein the first current, $I_{c1}$, and the second current, $I_{c2}$, fulfill $I_{c2}>3\cdot I_{c1}$.

3. The LED filament according to claim 1, wherein at least two LEDs of the first set of LEDs are coupled in parallel, and wherein at least two LEDs of the second set of LEDs are coupled in series.

4. The LED filament according to claim 1, wherein the circuitry comprises a first circuit coupled to the first set of LEDs and a second circuit coupled to the second set of LEDs, wherein the first and second circuit are electrically isolated from each other.

5. The LED filament according to claim 1, wherein the first set of LEDs is arranged to emit the first LED light with a first LED intensity, $ILED_1$, and wherein the second set of LEDs is arranged to emit the second LED light with a second LED intensity, $ILED_2$, wherein $ILED_2>2\cdot ILED_1$.

6. The LED filament according to claim 1, wherein the LED filament is arranged to emit LED filament light having a luminous flux, LF, wherein in case the luminous flux, LF, is above a first luminous flux threshold, $LF_{t1}$, the first set of LEDs is arranged to emit first LED light with a first LED intensity, $ILED_1$, and the second set of LEDs is arranged to emit second LED light with a second LED intensity, $ILED_2$, wherein $ILED_1\leq ILED_2<2\cdot ILED_1$, and in case the luminous flux, LF, is below a second luminous flux threshold, $LF_{t2}$, the first set of LEDs is arranged to emit first LED light with a first LED intensity, $ILED_1$, and the second set of LEDs is arranged to emit second LED light with a second LED intensity, $ILED_2$, wherein $ILED_2>8\cdot ILED_1$.

7. The LED filament according to claim 1, wherein the second set of LEDs is arranged to emit second LED light in a second wavelength subrange of 400-420 nm, wherein a first luminous intensity of the first LED light, Llb, and a second luminous intensity of the second LED light, LIv, fulfill 1.2·Llb>LIv>0.8·Llb.

8. The LED filament according to claim 1, wherein a number, $N_1$, of the LEDs of the first set of LEDs and a number, $N_2$, of the LEDs of the second set of LEDs fulfill $N_1>2\cdot N_2$.

9. The LED filament according to claim 1, wherein the luminescent material of the encapsulant comprises at least one of a YAG, LuAg and LuYAG phosphor.

10. The LED filament according to claim 1, wherein the LED filament has at least one of a spiral, meander, coil and helix shape.

11. The LED filament according to claim 1, wherein the LED filament light is white light having a correlated color temperature, CCT, below 2500 K.

12. A LED filament arrangement, comprising at least one LED filament according to claim 1, and a controller coupled to the circuitry, wherein the controller is configured to individually control the operation of the first set of LEDs and the second set of LEDs.

13. The LED filament arrangement according to claim 12, wherein the controller is configured to individually control the operation of the first set of LEDs and the second set of LEDs by at least one of increasing a first intensity, $ILED_1$, of the first set of LEDs, and increasing a second intensity, $ILED_2$, of the second set of LEDs such that $0\leq ILED_1\leq 0.5\cdot ILED_2$, and decreasing a first intensity, $ILED_1$, of the first set of LEDs, and decreasing a second intensity, $ILED_2$, of the second set of LEDs such that $0\leq ILED_1\leq 0.5\cdot ILED_2$.

14. A LED lighting device, comprising one of a LED filament according to claim 1, wherein the LED lighting device further comprises a cover comprising an at least partially transparent material, wherein the cover at least partially encloses the LED filament, and an electrical connection connected to the LED filament for a supply of power to the plurality of LEDs of the LED filament, and a LED filament arrangement, wherein the LED lighting device further comprises a cover comprising an at least partially transparent material, wherein the cover at least partially encloses the LED filament, and an electrical connection connected to the LED filament for a supply of power to the plurality of LEDs of the LED filament.

* * * * *